Figure 1:
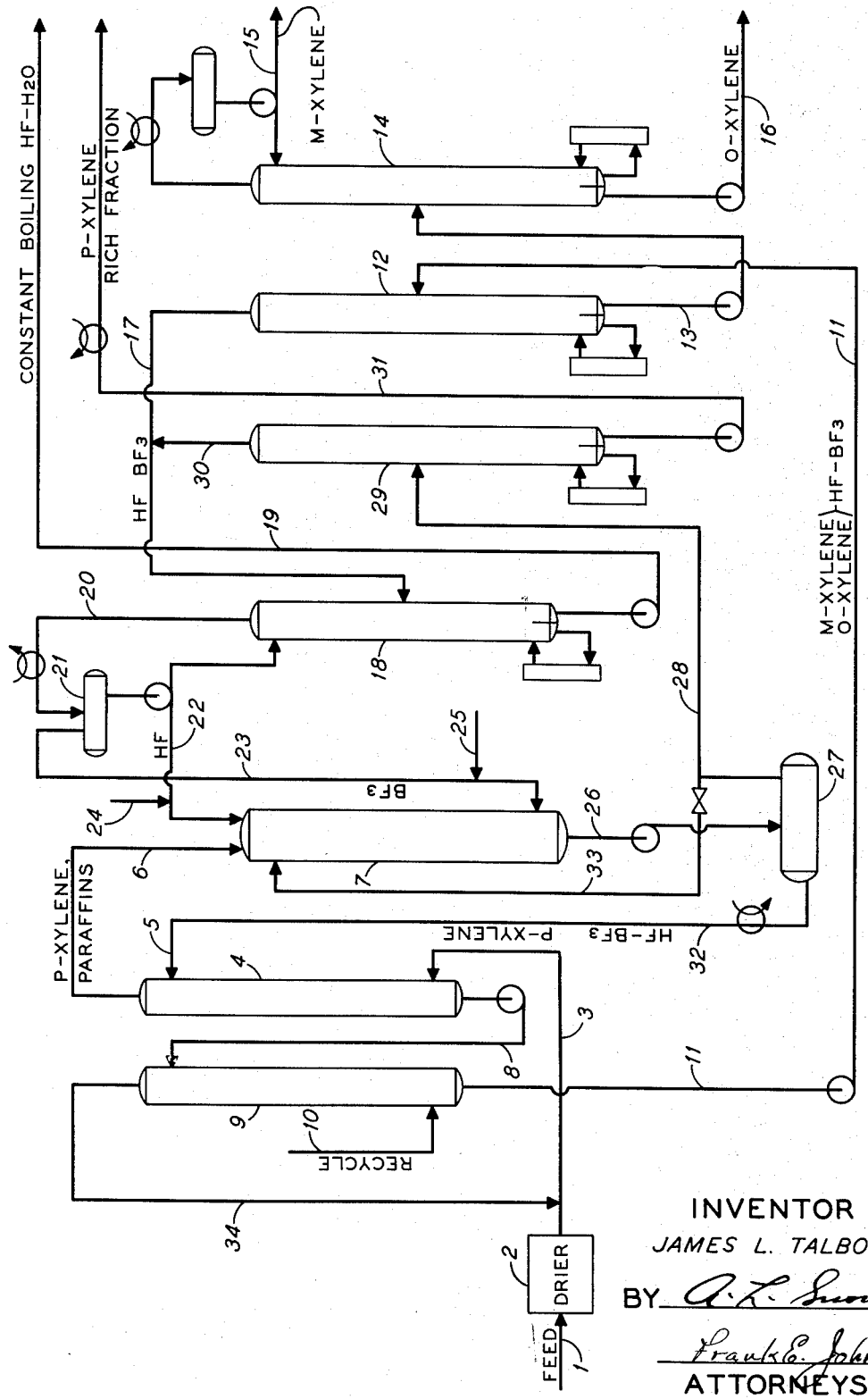

March 13, 1956 J. L. TALBOT 2,738,372
SEPARATION OF XYLENE ISOMERS

Filed Dec. 28, 1951 2 Sheets-Sheet 1

INVENTOR
JAMES L. TALBOT
BY
ATTORNEYS

March 13, 1956   J. L. TALBOT   2,738,372
SEPARATION OF XYLENE ISOMERS
Filed Dec. 28, 1951   2 Sheets-Sheet 2

INVENTOR
JAMES L. TALBOT
BY
ATTORNEYS

Patented Mar. 13, 1956

2,738,372

SEPARATION OF XYLENE ISOMERS

James L. Talbot, San Pablo, Calif., assignor to California Research Corporation, San Francisco, Calif., a corporation of Delaware Application December 28, 1951, Serial No. 263,867

9 Claims. (Cl. 260—674)

This invention relates to a process for separating individual xylene isomers from hydrocarbon mixtures containing substantial amounts of mixed xylene isomers.

A considerable incentive to separate individual xylene isomers has existed for a long time. Separation by fractional distillation is difficult and can be only partially effective because of the closeness of the boiling points of the individual isomers. Partial separation of para-xylene from mixtures of xylene isomers has been effected by a fractional crystallization. While separation of para-xylene by fractional crystallization is now being practiced commercially, low temperature crystallization processes are inherently expensive and the degree of separation of the individual isomers by such methods is severely limited by the eutectic properties of the mixed isomers.

Brooke et al. Patent No. 2,521,444 describes a process for separating meta-xylene from mixed xylene isomers by extracting the mixture with HF—BF$_3$ to separate an acid extract phase rich in meta-xylene and a hydrocarbon raffinate phase containing ortho-xylene and para-xylene and having a meta-xylene content very much lower than the meta-xylene content of the feed. Difficulty is experienced in attempting to practice the separation of meta-xylene in the manner described, since high pressures are required to maintain a sufficient BF$_3$ concentration in liquid HF to constitute an efficient extractive solvent. A high pressure system involving the use of such materials as HF and BF$_3$ is inherently hazardous and is usually adopted for commercial use only where no reasonably feasible alternative method is available.

It is an object of this invention to provide a method for separating individual xylene isomers from hydrocarbon mixtures containing them by a process utilizing the selectivity of HF—BF$_3$ for meta-xylene and involving low operational pressures ordinarily in the range from 20 to 100 p. s. i. g., usually 30 to 60 p. s. i. g.

HF—BF$_3$ may be employed as a selective solvent to extract aromatic hydrocarbons generally from mixtures of aromatic and non-aromatic hydrocarbons. This reagent exhibits stronger preference for some of the aromatics than for others. It apparently forms a loosely bonded complex with each of the xylene isomers, the relative stability of the complex formed with the meta-isomer being approximately ten times that of either of the other isomers and the stability of the complex with the para-isomer being somewhat less than the stability of the complex with the ortho-isomer.

In one embodiment of the invention a mixture of approximately equimolar quantities of BF$_3$ and either ortho-xylene or para-xylene, or a mixture of ortho- and para-xylenes, with a large molar excess of liquid hydrogen fluoride is formed. This mixture is then intimately contacted with a feed containing meta-xylene and at least one other xylene isomer. The feed and treating mixture are contacted at a temperature in the range from −50° F. to 120° F., preferably in the range from 30 to 90° F. After the contact is made, two phases are separated: A hydrocarbon phase richer in either para-xylene or ortho-xylene or both than the feed, and an acid phase rich in meta-xylene. Meta-xylene is then recovered from the acid phase by distilling it to separate HF and BF$_3$ overhead.

In another embodiment of the invention a mixture of equimolar quantities of para-xylene and BF$_3$ with a substantial excess of liquid HF is formed. A feed containing substantial quantities of ortho-xylene, meta-xylene and para-xylene is intimately contacted with this mixture at a temperature in the range from −50° F. to 120° F. The quantity of the para-xylene-HF—BF$_3$ mixture employed is such that its content of para-xylene is at least equal to the content of meta-xylene in the feed. Following the contact, two phases are separated: A hydrocarbon phase rich in para-xylene and substantially free of meta-xylene, and an acid phase rich in meta-xylene. The ortho-xylene may be directed to the hydrocarbon phase or to the acid phase, as desired, by varying the quantity of the para-xylene-HF—BF$_3$ mixture contacted with a given quantity of feed. If it is desired to recover the ortho-xylene in the hydrocarbon phase, the quantity of para-xylene-HF—BF$_3$ mixture employed is such that its para-xylene content does not exceed the meta-xylene content of the feed. If it is desired to recover the ortho-xylene in the acid phase, the quantity of para-xylene-HF—BF$_3$ mixture employed is such that its para-xylene content is at least equal to the sum of the meta-xylene content and ortho-xylene content of the feed. Para-xylene can then be recovered by cooling the hydrocarbon phase to separate paraxylene by fractional crystallization in the manner described in Arnold Patent No. 2,541,682. The acid phase is subjected to flash distillation to remove HF and BF$_3$ overhead. If the process has been operated so that both meta-xylene and ortho-xylene are recovered in the acid phase, separation of these two isomers is readily effected by fractional distillation or by re-extraction between them with HF—BF$_3$.

Individual xylene isomers may be separated from xylene mixtures from a variety of sources by the process of this invention. For example, xylene fractions from petroleum sources, coke oven light oil, drip oil, or the like, may be advantageously separated. Xylene-rich fractions obtained by catalytically reforming light fractions of naphthenic oils are readily separated by the process of the invention. A typical fraction of this character may boil in the range from about 270 to 290° F. and contain from 18 to 25% ortho-xylene, 45 to 50% meta-xylene, 17 to 23% para-xylene and 6 to 12% ethylbenzene. These figures are on the basis of a 100% aromatic C$_8$ fraction. If the aromatics are separated from catalytically reformed naphtha by solvent extraction, for example by SO$_2$ extraction, the extract will be substantially all aromatic and the above composition ranges will be approximately correct. In the event that the xylene fraction is separated from catalytically reformed naphtha by fractional distillation, it may have an appreciable content of non-aromatic hydrocarbons, for example, 10 to 15%, in which case the percentage content of the individual xylene isomers and ethylbenzene will be proportionately lower, but in approximately the same relative ratio as set out above.

As indicated above, the solvent with which the xylene feed is contacted may be either a mixture of approximately equimolar parts of para-xylene and BF$_3$ with a molar excess of liquid HF, a mixture of approximately equimolar parts of ortho-xylene and BF$_3$ with a substantial molar excess of liquid HF, or a mixture of approximately equimolar quantities of BF$_3$ and mixed ortho-para-xylenes with a substantial molar excess of liquid HF. Para-xylene, for the preparation of the para-xylene-HF—BF$_3$ mixture, may be prepared by fractional distillation as described in Arnold Patent No. 2,541,682. The para-xylene is then mixed with liquid HF, and BF$_3$ is pumped into this liquid mixture to form the solvent which has been described as a complex of para-xylene, hydrogen fluoride and boron trifluoride. Ortho-xylene, for the preparation of the ortho-xylene-HF—BF₃ mixture, may be prepared by careful fractional distillation of mixed xylenes in the manner described in Levine et al. Patent 2,474,002, where the preparation of an ortho-xylene concentrate containing 85 to 90% ortho-xylene is described.

Alternatively the ortho-xylene-HF—BF₃ mixture or para-xylene-HF—BF₃ mixture may be prepared by extracting meta-xylene from a xylene mixture pursuant to Brooke et al. 2,521,444 and then adding HF and BF₃ to the raffinate to form the desired mixture.

The invention will be more readily understood by reference to Figure 1 of the appended drawings which is a diagrammatic illustration of apparatus and a process flow suitable for the practice of the invention.

A feed containing substantial amounts of the xylene isomers is passed through line 1 into dryer 2 to remove suspended and dissolved water. Dryer 2 may actually be a rather elaborate drying system, since the water content of the system is desirably minimized in order to limit losses of HF through the formation of constant boiling HF-water mixtures. From the drying system the feed passes through line 3 into contacting zone 4 where it is contacted with a para-xylene-HF—BF₃ mixture introduced into zone 4 through line 5. Contacting zone 4 may be either a clear or packed column in which the feed is countercurrently contacted with the para-xylene-HF—BF₃ mixture, or one or more mixer-settler combinations may be substituted for the column in order to provide multiple countercurrent extraction stages.

In contacting zone 4 the para-xylene-HF—BF₃ mixture contacts the meta-xylene contained in the feed. Para-xylene is liberated from the mixture and a meta-xylene-HF—BF₃ mixture or complex is formed. The para-xylene contained in the feed together with the para-xylene liberated from the para-xylene-HF—BF₃ mixture flows from contacting zone 4 through line 6 into column 7. The meta-xylene-HF—BF₃ complex formed in extraction zone 4 flows from the extraction zone through line 8 into column 9. A small recycle stream of either ortho-xylene or meta-xylene is introduced into column 9 through line 10. This recycle stream serves to liberate para-xylene from any residual para-xylene-HF—BF₃ mixture or complex which may have come through contacting zone 4 without being decomposed either because imperfect contact was obtained or because an excess of the para-xylene-HF—BF₃ mixture was introduced into contacting zone 4. Para-xylene liberated in column 9 by the recycle xylene stream introduced through line 10 flows from column 9 through line 34 into line 3 and is thus re-introduced into contacting zone 4.

Para-xylene passing from contacting zone 4 through line 6 into column 7 will ordinarily contain non-aromatic hydrocarbons such as paraffins and naphthenes if the xylene feed stream is from a petroleum source; in addition, the para-xylene stream will contain a portion of any ethylbenzene which may have been present in the feed. The para-xylene stream passing through line 6 may or may not contain ortho-xylene depending upon the quantity of para-xylene-HF—BF₃ mixture introduced into contacting zone 4 via line 5. If the quantity of para-xylene-HF—BF₃ mixture so introduced is sufficiently large that its para-xylene content is equal to the sum of the meta-xylene and ortho-xylene contained in the feed, then the ortho-xylene will leave contactor 4 via line 8 and will be removed from the system with the meta-xylene from which it will be separated by fractional distillation or by re-extraction. Conversely, if the quantity of the para-xylene-HF—BF₃ mixture introduced into contactor 4 is such that its para-xylene content is equal only to the meta-xylene content of the feed, then the ortho-xylene contained in the feed will leave contactor 4 with the para-xylene through line 6 and can be separated from the para-xylene subsequently by fractional distillation. The latter method requires fewer effective stages in contacting zone 4.

The meta-xylene-HF—BF₃ mixture or complex produced in contactor 4 and purified in column 9 passes from column 9 through line 11 into column 12 where it is flash distilled to liberate HF and BF₃ as an overhead fraction. When the quantity of para-xylene-HF—BF₃ mixture employed in the process is such that the para-xylene content is equal to the sum of the ortho-xylene and meta-xylene contents of the feed, a mixture of two complexes, i. e., meta-xylene-HF—BF₃ and ortho-xylene-HF—BF₃ flow through line 11 into distillation zone 12. Operating in this manner a mixture of ortho-xylene and meta-xylene is withdrawn from column 12 through line 13 and passed into fractional distillation column 14. Column 14 is an efficient distillation column operating at a high reflux ratio. Meta-xylene is separated as the overhead fraction and is removed as a product through line 15. Ortho-xylene is removed from distillation column 14 as a kettle product through line 16. HF and BF₃, separated as the overhead fraction in flash distillation column 12, pass through line 17 into distillation column 18. In addition to HF and BF₃ entering column 18, there is some water which has entered the system with the feed or through leakage. A constant boiling HF-water mixture is removed as a bottoms product from distillation column 18 through line 19 and is rejected from the system. HF and BF₃ pass from distillation column 18 overhead through line 20 to liquid gas separator 21. Sufficient heat exchange is provided in line 20 to bring about condensation of the HF. A part of the liquid HF phase formed in liquid gas separator 21 is returned to column 18 as reflux. Liquid HF is also withdrawn from liquid-gas separator 21 through line 22 and passed into column 7. BF₃ is withdrawn from liquid-gas separator 21 through line 23 and introduced into the lower part of column 7. Makeup HF and BF₃ may be introduced into the system via lines 24 and 25, respectively. In column 7 para-xylene, HF and BF₃ are contacted to form the para-xylene-HF—BF₃ extraction mixture or complex. The mixture of hydrocarbons, HF and BF₃ formed in column 7 passes from column 7 through line 26 into separator 27. In separator 27 an upper hydrocarbon phase comprising excess para-xylene, paraffins and ethylbenzene is formed and a lower acid phase comprising principally para-xylene-HF—BF₃ mixture is formed. The hydrocarbon phase is withdrawn from separator 27 via line 28 and passed into column 29 where it is subjected to flash distillation to remove traces of HF and BF₃ overhead. The HF and BF₃ may be alternately removed by caustic washing instead of distillation. A portion of the hydrocarbon phase may be returned to the upper part of column 7 via line 33. HF and BF₃ leave column 29 through line 30 and then pass through line 17 into column 18. A hydrocarbon bottoms product is withdrawn from column 29 through line 31. This hydrocarbon fraction is rich in para-xylene and pure para-xylene may be readily recovered from it by fractional crystallization. In the event that the quantity of para-xylene-HF—BF₃ introduced into contactor 4 is such that its para-xylene content is equal only to the meta-xylene content of the feed, then the hydrocarbon fraction leaving column 29 via line 31 will contain not only para-xylene but also the ortho-xylene of the feed. The ortho-xylene and para-xylene can then be separated by fractional distillation and pure para-xylene recovered from the overhead fraction by fractional crystallization. The acid phase formed in separator 27 is withdrawn from the separator via line 32 and passed through line 5 into contactor 4 to treat further quantities of feed.

As indicated above, the solution introduced into contactor 4 via line 5 may be either the para-xylene-HF—BF₃ mixture or an ortho-xylene-HF—BF₃ mixture. If the ortho-xylene-HF—BF₃ mixture is employed, the quantity introduced into contactor 4 will be such that its ortho-xylene content is approximately equal to the meta-xylene content of the feed. The hydrocarbon fraction leaving contactor 4 via line 6 will contain both ortho-xylene and para-xylene which are contacted in column 7 with HF and BF₃. The acid phase then formed in separator 27 will consist predominantly of the ortho-xylene-HF—BF₃ mixture or complex.

It will be evident further that if operation is commenced introducing para-xylene-HF—BF₃ mixture into contractor 4 and if the amount introduced into contactor 4 is such that its para-xylene content is equal only to the meta-xylene content of the feed, then both ortho-xylene and para-xylene will be contained in the hydrocarbon effluent from contactor 4 via line 6 and, after a relatively short period of operation, the acid phase formed in separator 27 will consist predominantly of the ortho-xylene-HF—BF₃ mixture or complex.

Figure 2:
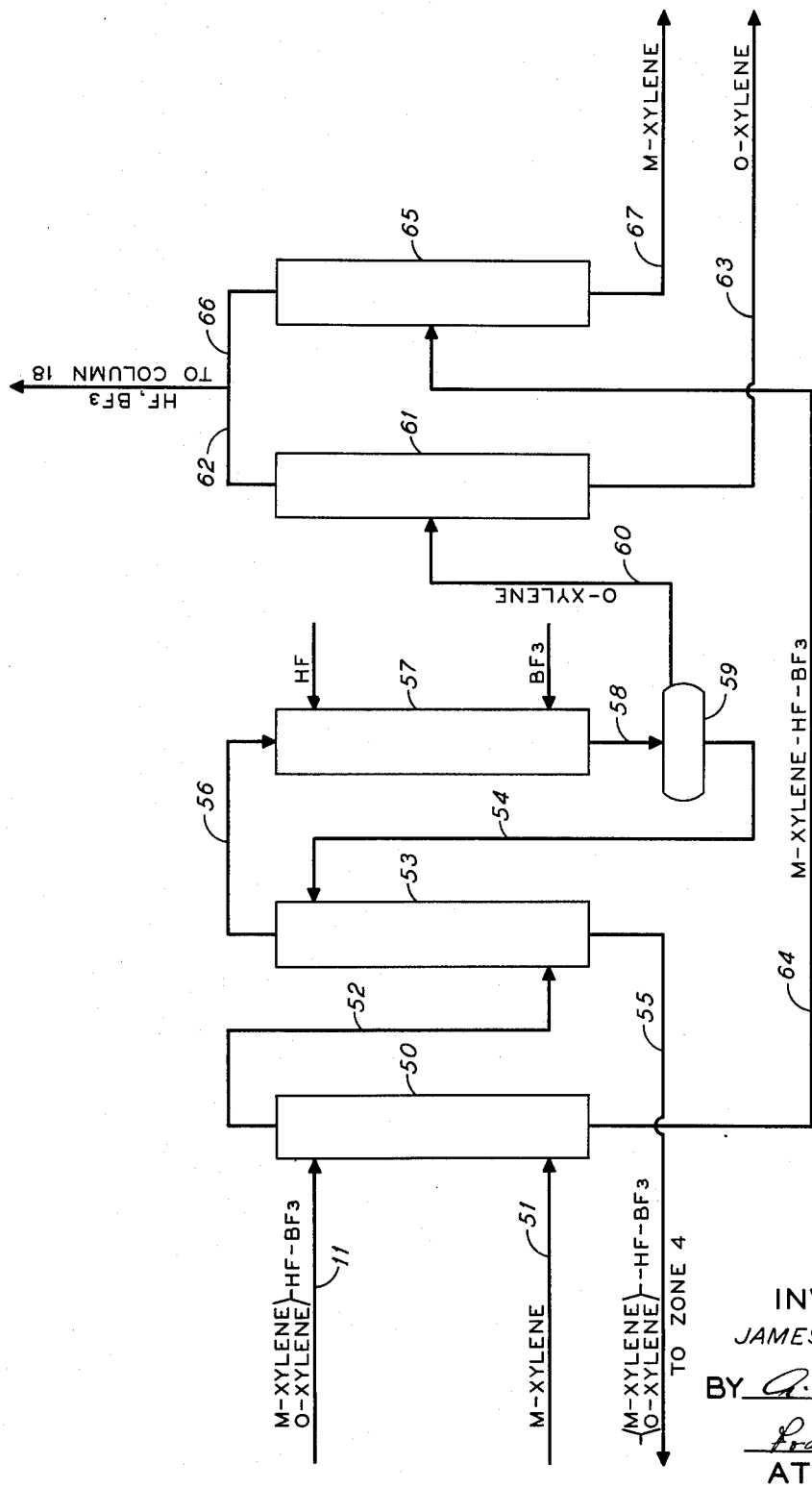

When the extraction is conducted so that a mixture of both ortho-xylene and meta-xylene complex with HF and BF₃ is withdrawn from column 9 through line 11, the separation of ortho-xylene and meta-xylene may be made by further extraction instead of fractional distillation. This alternative separation is illustrated in Fig. 2 of the appended drawings. The effluent from column 9 comprising ortho-xylene, meta-xylene, HF and BF₃ is passed through line 11 into the upper portion of column 50. Meta-xylene is introduced through line 51 into the lower portion of column 50 in sufficient quantity to displace the ortho-xylene from the ortho-xylene-HF—BF₃ mixture. Ortho-xylene and excess meta-xylene are withdrawn from column 50 through line 52 and introduced into the lower portion of column 53. Ortho-xylene-HF—BF₃ complex is introduced into the upper portion of column 53 through line 54. In column 53 the meta-xylene contained in the stream entering the column through line 52 displaces ortho-xylene from the ortho-xylene-HF—BF₃ complex. A mixture of meta-xylene-HF—BF₃ complex and ortho-xylene-HF—BF₃ complex is withdrawn from the bottom of column 53 through line 55 and returned to zone 4 of Fig. 1 for re-separation. Substantially pure ortho-xylene is withdrawn from column 53 through line 56 and passed into column 57 where it is contacted with HF and BF₃ to form ortho-xylene-HF—BF₃ complex; this complex and excess ortho-xylene is withdrawn from column 57 through line 58 and introduced into separator 59. In separator 59 a hydrocarbon phase consisting of ortho-xylene and containing minor amounts of HF and BF₃ separates as an upper phase and a lower phase comprising an ortho-xylene-HF—BF₃ mixture separates. This latter phase is withdrawn from separator 59 for introduction into column 53 through line 54. Ortho-xylene is withdrawn from separator 59 through line 60 and introduced into distillation column 61 where any remaining HF and BF₃ are flashed from the ortho-xylene. HF and BF₃ are with drawn from column 61 through line 62. Ortho-xylene is withdrawn from the bottom of column 61 through line 63 as a product. Meta-xylene-HF—BF₃ complex is withdrawn from the bottom of column 50 through line 64 and introduced into distillation column 65 where HF and BF₃ are flashed from the mixture. HF and BF₃ are withdrawn from column 65 through line 66. The HF and BF₃ flashed from columns 61 and 65 are returned to column 18 of Fig. 1 for distillation. Meta-xylene is withdrawn from the bottom of column 65 through line 67 as a product.

To prepare the para-xylene-HF—BF₃ mixture to start up the process, one molar part of para-xylene and 1 to 100 molar parts of liquid HF, preferably 1 to 30 molar part of liquid HF, are mixed together. BF₃ is then pumped into the mixture until approximately one molar part of BF₃ is present in the liquid phase. If it is desired to start the process with the ortho-xylene-HF—BF₃ mixture or complex, the same proportions of xylene, HF and BF₃ are employed in preparing the mixture.

Obviously many modifications and variations of the invention as hereinbefore set forth may be made without departing from the spirit and scope thereof, and only such limitations should be imposed as are indicated in the appended claims.

I claim:
1. A process for separating mixtures of xylene isomers which comprises forming a complex of HF, BF₃ and a material of the group consisting of ortho-xylene and para-xylene, contacting a feed containing meta-xylene and at least one other xylene isomer with the complex at a pressure in the range about 20–100 p. s. i. g., separating a hydrocarbon phase rich in xylene other than meta-xylene and lean in meta-xylene and an acid phase comprising HF, BF₃ and meta-xylene, and distilling the acid phase to separate HF and BF₃ from meta-xylene.

2. A process for separating mixtures of xylene isomers which comprises forming a complex of para-xylene, BF₃ and HF, contacting a feed containing meta-xylene and para-xylene with the complex at a pressure in the range about 20–100 p. s. i. g. to form a hydrocarbon phase rich in para-xylene and a denser phase comprising a complex of metal-xylene with HF and BF₃ and separating the phases.

3. A process for separating mixtures of xylene isomers which comprises forming a complex of ortho-xylene, HF and BF₃, contacting a feed containing ortho-xylene, meta-xylene and para-xylene with the complex at a pressure in the range about 20–100 p. s. i. g. to form a hydrocarbon phase rich in ortho-xylene and para-xylene and substantially free of metal-xylene and an acid phase comprising a meta-xylene-HF—BF₃ mixture and separating the phases.

4. A process for separating mixtures of xylene isomers which comprises forming a mixture of approximately equimolar quantities of BF₃ and a liquid xylene consisting essentially of a mixture of at least one xylene of the group consisting of ortho-xylene and para-xylene with a molar excess of HF, intimately contacting a feed containing the three xylene isomers with the mixture at a temperature in the range —50° F. to 120° F. and at a pressure in the range of 20–100 p. s. i. g., separating a hydrocarbon phase rich in xylenes other than meta-xylene and lean in meta-xylene and an acid phase richer in meta-xylene than the feed and distilling the acid phase to separate meta-xylene and HF and BF₃.

5. A process for separating mixtures of xylene isomers which comprises forming a mixture of approximately equimolar quantities of BF₃ and para-xylene with a molar excess of HF, intimately contacting a feed containing meta-xylene and para-exylene with the mixture at a temperature in the range —50° F. to 120° F. and at a pressure in the range 20–100 p. s. i. g., separating a hydrocarbon phase richer in para-xylene than the feed and an acid phase richer in meta-xylene than the feed and distilling the acid phase to separate meta-xylene and HF and BF₃.

6. A process for separating mixtures of xylene isomers which comprises forming a mixture of approximately equimolar quantities of BF₃ and ortho-xylene with a molar excess of HF, intimately contacting a feed containing meta-xylene, ortho-xylene and para-xylene with the mixture at a temperature in the range —50° F. to 120° F. and at a pressure in the range 20–100 p. s. i. g., separating a hydrocarbon phase richer in para-xylene and ortho-xylene than the feed and an acid phase rich in meta-xylene, and fractionally distilling the acid phase to separate meta-xylene from HF and BF₃.

7. A process for separating concentrates of individual xylene isomers from a hydrocarbon feed consisting predominantly of C₈ aromatic hydrocarbons which comprises forming a complex of para-xylene, HF and BF₃, intimately contacting the feed at a pressure in the range 20–100 p. s. i. g. with a quantity of the complex having a para-xylene content approximately equal to the meta-xylene contained in the feed, separating a hydrocarbon phase comprising ortho-xylene and para-xylene and substantially free of meta-xylene and an acid phase comprising a complex of meta-xylene with HF and BF$_3$, fractionally distilling the hydrocarbon phase to separate a para-xylene rich overhead fraction and a kettle product consisting predominantly of ortho-xylene, cooling the overhead fraction to crystallize para-xylene and separating solid para-xylene from the cooled fraction, heating the acid phase to decompose the complex of meta-xylene with HF and BF$_3$ and separating the HF and BF$_3$ as a vapor phase and meta-xylene as a liquid phase.

8. A process for separating concentrates of individual xylene isomers from a hydrocarbon feed consisting predominantly of C$_8$ aromatic hydrocarbons including ortho-xylene, meta-xylene and para-xylene, which comprises forming a complex of ortho-xylene, HF and BF$_3$, intimately contacting the feed at a pressure in the range 20–100 p. s. i. g. with a quantity of the complex having an ortho-xylene content approximately equal to the meta-xylene contained in the feed, separating a hydrocarbon phase comprising ortho-xylene and para-xylene and substantially free of meta-xylene and an acid phase comprising a complex of meta-xylene with HF and BF$_3$, fractionally distilling the hydrocarbon phase to separate a para-xylene rich overhead fraction and a kettle product consisting predominantly of ortho-xylene, heating the acid phase to decompose the complex of meta-xylene with HF and BF$_3$ and separating the HF and BF$_3$ as a vapor phase from meta-xylene as a liquid phase.

9. A process for separating concentrates of individual xylene isomers from a hydrocarbon feed consisting predominantly of C$_8$ aromatic hydrocarbons including ortho-xylene, meta-xylene and para-xylene which comprises forming a complex of para-xylene, HF and BF$_3$, intimately contacting the feed at a pressure in the range 20–100 p. s. i. g. with a quantity of the complex having a para-xylene content approximately equal to the combined meta-xylene and ortho-xylene contained in the feed, separating a hydrocarbon phase comprising para-xylene and substantially free of ortho-xylene and meta-xylene and an acid phase comprising complexes of meta-xylene and ortho-xylene with HF and BF$_3$, removing the hydrocarbon phase as a product, heating the acid phase to decompose the complexes and drive off HF and BF$_3$ as a vapor phase, leaving a liquid phase comprising ortho-xylene and meta-xylene and separating ortho-xylene and meta-xylene by fractional distillation.

References Cited in the file of this patent

UNITED STATES PATENTS

| 2,257,086 | Atwell | Sept. 30, 1941 |
| 2,521,444 | Brooke et al. | Sept. 5, 1950 |
| 2,528,892 | Lien et al. | Nov. 7, 1950 |

FOREIGN PATENTS

| 978,799 | France | Apr. 18, 1951 |

OTHER REFERENCES

McCaulay et al.: Industrial and Eng. Chem., vol. 42, No. 10, October 1950, pages 2103–5.